United States Patent [19]

Sudderth et al.

[11] Patent Number: 5,196,095

[45] Date of Patent: Mar. 23, 1993

[54] PROCESS FOR RECOVERING A METAL FROM AN AQUEOUS SOLUTION COMPRISING A MIXTURE OF METAL CHLORIDES

[75] Inventors: Robert B. Sudderth; Archibald W. Fletcher; Stephen M. Olafson, all of Tucson, Ariz.

[73] Assignee: Henkel Corporation, Ambler, Pa.

[21] Appl. No.: 504,166

[22] Filed: Apr. 3, 1990

[51] Int. Cl.$^5$ .......................... C25C 1/12; C25C 1/16
[52] U.S. Cl. .................................. 204/106; 204/114; 423/24; 423/109
[58] Field of Search .................. 423/24, 139, DIG. 4, 423/150, 38, 109; 204/105 R, 106, 114

[56] References Cited

U.S. PATENT DOCUMENTS

| | | | |
|---|---|---|---|
| 4,015,980 | 4/1977 | MacKay | 75/120 |
| 4,065,502 | 12/1977 | MacKay | 260/590 |
| 4,175,012 | 11/1979 | MacKay et al. | 423/24 |
| 4,252,621 | 2/1981 | Reinhardt et al. | 423/24 |
| 4,272,492 | 6/1981 | Jensen | 423/24 |
| 4,331,634 | 5/1982 | Shanton et al. | 423/22 |
| 4,507,268 | 3/1985 | Kordosky | 423/24 |
| 4,525,330 | 6/1985 | Dalton | 423/24 |
| 4,544,532 | 10/1985 | Kordosky | 423/24 |
| 4,576,815 | 3/1986 | Robinson | 423/658.5 |
| 4,581,220 | 4/1986 | Nelson | 423/658.5 |
| 4,582,689 | 4/1986 | Kordosky | 423/24 |
| 4,675,172 | 6/1987 | Quan | 423/658.5 |
| 4,683,310 | 7/1987 | Dalton | 546/321 |
| 4,696,801 | 9/1987 | Devonald et al. | 423/24 |
| 4,739,054 | 4/1988 | Quan | 544/263 |
| 4,775,763 | 10/1988 | Dalton | 546/286 |

FOREIGN PATENT DOCUMENTS

| | | |
|---|---|---|
| 1130237 | 8/1982 | Canada . |
| 0057797 | 8/1982 | European Pat. Off. . |
| 0112617 | 7/1984 | European Pat. Off. . |
| 0193307 | 9/1986 | European Pat. Off. . |
| 0196153 | 10/1986 | European Pat. Off. . |
| 0301783 | 2/1989 | European Pat. Off. . |
| 0339558 | 11/1989 | European Pat. Off. . |
| 3801430 | 8/1989 | Fed. Rep. of Germany . |
| 2607021 | 11/1986 | France . |
| 2122592 | 1/1984 | United Kingdom . |
| 2122593 | 1/1984 | United Kingdom . |
| 82-01369 | 4/1982 | World Int. Prop. O. . |

OTHER PUBLICATIONS

*Hydrometallurgy*, vol. 18, No. 1, Sato et al., pp. 105–115, "Copper (II) Complexes Formed in the Extraction of Copper from Hydrochloric Acid Solutions . . . ".
Edmiston, K. J. "An Update on Chloride Hydrometallurical Process for Sulfide Concentrates" Feb. 26 to Mar. 1, 1984 pp. 1–7 Preprint No. 84–114.
Dalton, R. F. et al., "The Cuprex Process—A New Chloride—Based Hydrometal-Lurgical Process for The Recovery Of Copper From Sulphidic Ores" Feb. 12,–Feb. 13, 1987.
Fletcher, A. W. "Future Potential for Chloride Hydrometallurgy" pp. 495–508, Chapter 29.
Kyuchoukov, G. D. et al., "A Method For Recovery Of Metals From Chloride Solutions" pp. 1–15.

*Primary Examiner*—John S. Maples
*Attorney, Agent, or Firm*—Ernest G. Szoke; Wayne C. Jaeschke; Daniel S. Ortiz

[57] ABSTRACT

A process for recovery of metal values from a mixed metal chloride containing leach solution by contacting the leach solution with a water immiscible solution of a complexing agent selective for the neutral chloride of the metal to be recovered and a chelating agent having affinity for the cation of the metal to be recovered. The chloride ion is washed from the water immiscible solution by contact with a chloride ion washing solution. The water immiscible solution containing the chelated metal ion is stripped with an aqueous stripping solution. The metal is recovered from the aqueous stripping solution.

21 Claims, 1 Drawing Sheet

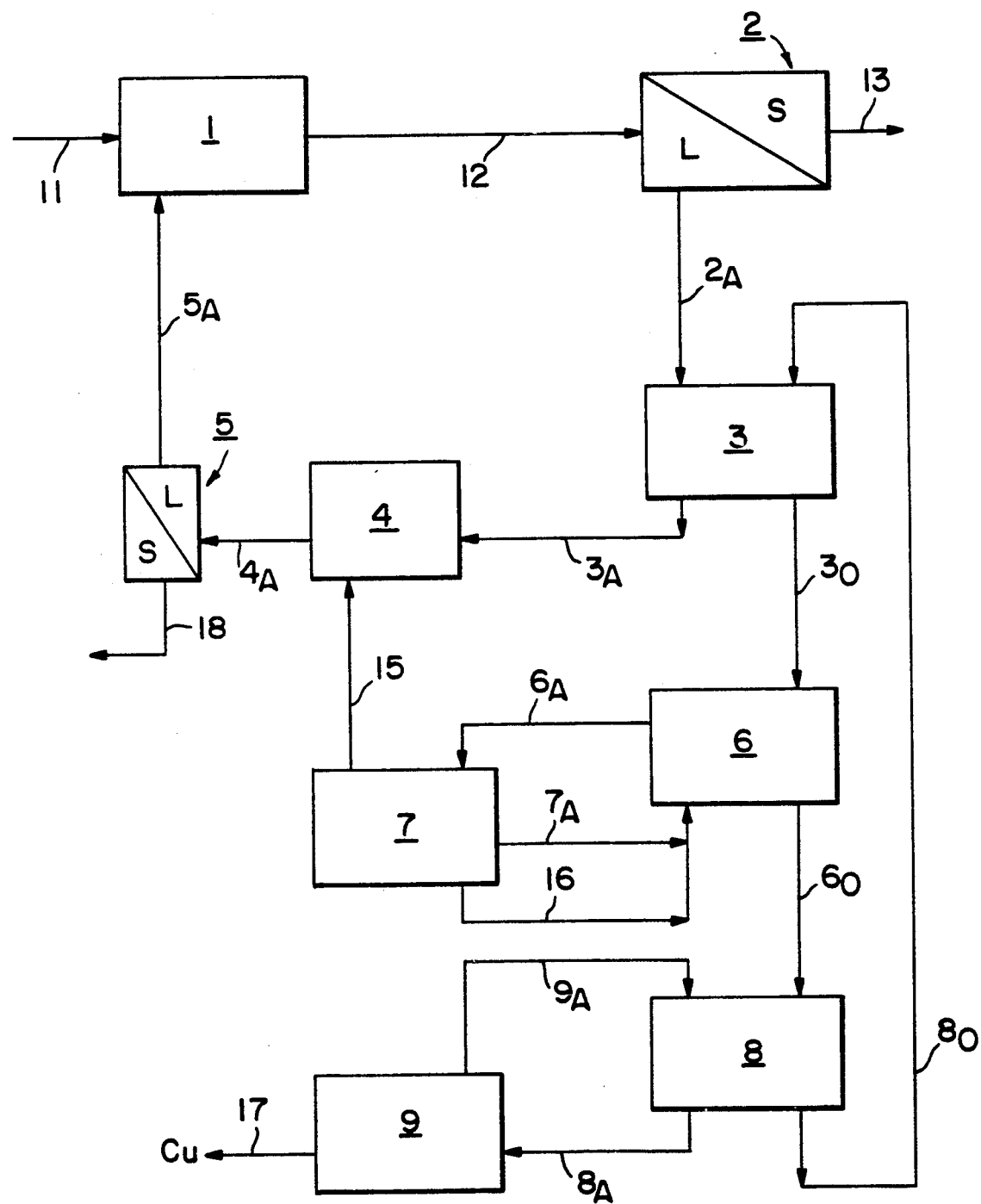

PROCESS FOR RECOVERING A METAL FROM AN AQUEOUS SOLUTION COMPRISING A MIXTURE OF METAL CHLORIDES

BACKGROUND OF THE INVENTION

1. Field of the Invention

The invention is a process for recovering a metal from an aqueous solution containing a mixture of metal chlorides.

2. Statement of related art

Chloride hydrometallurgy for metal extraction from sulfide ore has been known for many years as a low cost, pollution free alternative to smelting.

In the chloride metal extraction process, the metal values are released from the ore and the sulfur values remain as elemental sulfur and pyrites. The process has a minimum impact on the environment since the sulfur values in the ore remain as solid elemental sulfur and pyrites. The environmental pollution potential of sulfur dioxide production and acid rain is substantially reduced.

Chloride hydrometallurgy has not become commercially popular due to the difficulty in winning the metal from the chloride solution when the sulfide ores contain significant amounts of chloride soluble metals other than the metal to be recovered. In addition, winning of the metal from the chloride solution presents problems. In particular, copper is recovered in a granular form rather than in sheet form, as in electrolysis of a copper sulfate solution.

STATEMENT OF THE RELATED ART

Processes for recovery of metals from ores by chloride hydrometallurgy are described in "AN UPDATE ON CHLORIDE HYDROMETALLURGICAL PROCESSES FOR SULFIDE CONCENTRATES" Edminston, Kenneth J., Society of Mining Engineers of AIME, Preprint No. 84,114 for presentation at the SME-AIME Annual Meeting, Los Angeles, Calif., Feb. 26-Mar. 1, 1984; "The Cuprex Process-A New Chloride-Based Hydrometallurgical Process For Recovery of Copper From Sulfidic Ores" Dalton, Raymond F., Hermona, Enrica, Hoffman, Barry L., Price, Raymond, AMC, Denver, Colo., Feb. 12-13, 1987 and "Future Potential For Chloride Hydrometallurgy", Fletcher, A. W., Advances in Minerals Processing, P. Somasundaran, Editor. SME-AIME, New Orleans, March 1986, pages 495–508.

The processes described all utilize a chloride extraction step to recover base metals from an ore or ore concentrate followed by complex process steps to separate the desired metal or metals from the chloride solution. The processes are particularly difficult when the ore contains several metal sulfides (dirty ores) that form a mixture of metal chlorides in solution which are difficult to separate.

The CUPREX process was developed to overcome some of the difficulties in handling dirty ores. The process utilizes a new selective solvent extractant for copper. A solution of the new solvent extractant for copper in a water immiscible solvent is contacted with the aqueous chloride solution containing copper. The copper chloride is selectively transferred to the immiscible organic phase. The immiscible organic phase containing the extracted copper chloride is then contacted with a stripping solution which strips the copper chloride from solution in the immiscible organic solvent. The aqueous phase containing the stripped copper chloride is then passed to an electrolysis cell where the copper is recovered in a granular form. The process suffers from the deficiencies in electrolysis of copper chloride solutions in that the electrolysis is a difficult one and the copper is recovered in a granular rather than a sheet form.

Bulgarian Patent Publication 0 301 783 A2 to Kyuchoukov et al, of which one Applicant is a coinventor, discloses a method for recovery of metals from chloride solutions. The metals are recovered from solutions which contain no substantial amounts of metal chlorides other than the chloride of the metal to be recovered. In the process, the metal chloride is extracted from the aqueous metal chloride containing solution as a charged complex by contact with a solution of an amine type extractant and a chelating type compound in the immiscible solvent.

The charged metal chloride complex ions are extracted from the aqueous chloride solution principally by the amine component of the immiscible organic phase. The chloride ion component of the extracted charged metal chloride complex is then removed (washed) from the organic phase by contact with water or an alkaline ammonia solution (pH 4–7). The metal cations, free of chloride ions, are simultaneously extracted into the organic phase by the chelating component dissolved in the organic phase. The metal ions, substantially chloride free, are stripped from the organic phase by contacting this phase with a sulfuric acid solution to produce a copper electrolyte suitable for electrowinning of copper metal by conventional methods.

The immiscible solvent containing the amine and the chelating agent are then contacted with chloride containing solution and recirculated back to the step for extraction of the metal chloride from the metal chloride containing solution.

The process as disclosed by Kyuchoukov et al. extracts metal chloride from a solution which does not contain significant amounts of chlorides of other metals and would not be suitable for extracting a metal chloride from a mixture of metal chlorides from chloride leaching of a mixed or dirty ore. This is due to the nonselective nature of the amine component of the solvent phase.

BRIEF DESCRIPTION OF THE INVENTION

The present invention is a process for recovering a metal from a chloride leach solution containing chlorides of at least two metals obtained from leaching a sulfide ore of the metal to be recovered. The process is particularly useful for recovering copper from a leach solution from an ore or ore concentrate containing significant amounts of zinc, silver and iron. The process is also applicable to copper chloride solutions free of other metal chlorides.

According to the present invention, the metal is recovered from an aqueous solution comprising a mixture of metal chlorides by a process which comprises; (A) contacting the aqueous solution with a solution of a complexing agent, selective for the neutral metal chloride of the metal to be recovered, and a chelating agent, selective for the cation of the metal to be recovered, in a water immiscible solvent, to form a solution containing a complex of the complexing agent and the neutral metal chloride of the metal to be recovered in the water immiscible solvent; (B) separating the water immiscible solvent from the aqueous solution comprising the mixture of metal chlorides; (C) contacting the water immiscible solvent, containing the neutral metal chloride complex, with an aqueous stripping solution to remove chloride ions from the water immiscible solvent and chelate the cation of the metal to be recovered in solution in the water immiscible solvent; (D) contacting the water immiscible solvent containing the chelated cation of the metal to be recovered with an aqueous metal cation stripping solution to form an aqueous solution rich in the metal cation of the metal to be recovered and a water immiscible solvent containing a reduced amount of chelated cation of the metal to be recovered; and (E) recovering the metal from the aqueous solution containing the cation of the metal to be recovered.

The process of the present invention is particularly useful for recovering copper from aqueous leach solutions containing at least one multivalent metal ion besides copper and particularly a leach solution from a "dirty ore" or "dirty ore concentrate".

BRIEF DESCRIPTION OF THE FIGURE

The figure is a schematic diagram of a process for recovering copper from an ore concentrate containing chloride soluble iron, zinc and silver.

DETAILED DESCRIPTION OF THE INVENTION

Chloride leaching processes are generally acidic, i.e., operate in a pH range of 0–4. These processes generally rely on the oxidation of the metal values in the sulfide ore or ore concentrate to extract the metal in the form of its chloride salt and converting the sulfide sulphur values to elemental sulfur which is a solid and is eliminated from the process along with the undissolved insoluble portions of the ore. The insoluble materials can include silicates, pyrites and the like.

The elemental sulfur values can be recovered from the insoluble materials by heating to melt the sulfur or by contacting with a solvent for the sulphur.

A preferred method of the present invention is to contact an ore concentrate with the leaching solution containing chloride at a pH in the range of 0–4.

The leaching solution suitable for use in the process of the present invention preferably contains multivalent metal ions in the highest oxidation state. On contact with the ore or ore concentrate, the metal chlorides in the solution are reduced, the metal sulfide values to be extracted are oxidized and the sulphur is precipitated in its elemental form.

In a process for recovery of copper from a copper containing ore, the leach solution is preferably an acid solution at a pH below about one (1) containing cupric chloride and/or ferric chloride.

The solution of the chlorides of the metals and formation of free sulphur occurs in the leaching process. Generally, pyrites are not affected by the chloride solution and remain in the solid materials which are discarded. However, other iron compounds may be soluble and if present, a portion generally appears in the chloride solution.

If iron is present, the solution must be at a pH below about 2.5 or iron hydroxide will precipitate.

The chloride leach solution containing the chloride of the metal to be recovered and at least one other multivalent metal chloride is separated from the undissolved portions of the ore. The separation can be done by any means suitable for separating a solid from liquid such as filtration, settling, liquid cyclones, centrifuges and combinations of the above methods.

The metal chloride containing leach solution which has been separated from the solids is then contacted with a solution of a complexing agent selective for the neutral metal chloride of the metal to be recovered and a chelating agent for the cations of the metal to be recovered in a water immiscible solvent. The neutral metal chloride, of the metal to be recovered, is complexed with the complexing agent and is transferred from the aqueous solution to the water immiscible solvent. As used herein, neutral metal chloride denotes a metal chloride which does not carry a net electrical charge.

The aqueous solution having the content of metal chloride of the metal to be recovered substantially reduced, can be further treated and recycled back to the leaching step. The aqueous solution is generally treated to remove other metals which are extracted from the ore and tend to accumulate in the leach solution. In addition, the multivalent metal chlorides which remain in the leach solution can be oxidized to their highest oxidation state before recirculation to the leaching step. The chloride concentration of the leach solution must be replenished in an amount at least equal to the amount of chloride ion extracted into the immiscible solvent as the neutral metal chloride.

The complexing agent which is in solution along with the chelating agent in the water immiscible solvent must be selective for the neutral chloride of the metal to be recovered.

As used herein, selectivity means the ability of the complexing agent to extract the neutral chloride of the desired metal to the virtual exclusion of other metal chlorides in the aqueous solution. In the process of the present invention, the selectivity of the copper complexing agent for copper over iron, zinc, or other impurities is preferably in the range of about 10:1 or higher.

The concentration of the complexing agent for the neutral metal chloride of the metal to be recovered and the concentration of the chelating agent for the cation of the metal to be recovered can vary over a broad range in the solvent phase depending on the solubility of the various materials in the immiscible solvent and the concentration of the chloride of the metal to be recovered in the aqueous leach solution. Generally, the concentration of the complexing agent for the neutral metal chloride is in the range of from about 0.3% to about 60% by volume of the immiscible solvent solution and preferably in the range of about 5% to about 40% by volume of the immiscible solvent solution. In addition, the phase ratio, organic to aqueous, can be adjusted to ensure substantially complete extraction of the neutral metal chloride.

Complexing agents such as disclosed in European Patent Application 81-306103.3 (Publication Number 0057,797) to Imperial Chemical Industries PLC, the contents of which is incorporated herein by reference, are useful in the process of the invention. Other complexing agents that will selectively extract a complex of a metal chloride into a water immiscible organic phase can be used in the present invention.

Complexing agents such as pyridine derivatives as disclosed in U.S. Pat. No. 4,775,763 (1988), U.S. Pat. No. 4,683,310 (1987) and U.S. Pat. No. 4,525,330 (1985) include useful chloride complexing agents for use in the present invention. The contents of which patents are incorporated herein by reference.

The pyrimidines, pyrazines and pyridazines derivatives disclosed in U.S. Pat. No. 4,576,815 (1986) and U.S. Pat. No. 4,581,220 (1986), which are incorporated herein by reference, include useful chloride complexing agents.

U.S. Pat. No. 4,696,801 which is incorporated herein by reference, discloses bimidazoles and bibenzimidazoles which can be useful as chloride complexing agents in the practice of the invention.

EP-193,307, which is incorporated herein by reference, discloses chloride complexing agents which can be useful in the practice of the invention.

U.S. Pat. No. 4,675,172 and U.S. Pat. No. 4,739,054 disclose triazalopyrimidines which can be useful in the present invention; the contents of which patents are incorporated herein by reference.

European Patent 0 196,153 discloses biimidazole and bibenzimidazole compounds which can be useful in the practice of the present invention. In particular the compounds disclosed which are selective for zinc chloride are particularly useful for recovering zinc from chloride solutions obtained from ores containing copper, zinc and iron. Some of the compounds can also be useful for recovering copper values from acidic chloride leach solutions.

Canadian Patent 1,233,472 (1989), which is incorporated herein by reference, discloses 1, 2, 4-triazoles which can be useful in the practice of the invention.

British specification 2,122,592 (1984) and 2,122,593 (1984) discloses a process which utilizes metal chloride complexing reagents which can be useful in the present invention. The British specifications are incorporated herein by reference.

The particular complexing agent for the neutral metal chloride, utilized in the process of the invention, is dependent on the particular metal to be recovered and the other metal chlorides present in the aqueous solution of metal chlorides. The selectivity of the complexing agent for the neutral chloride of the metal to be recovered in relation to the other metal chlorides in the mixture, is a major consideration for one desiring to use the present process. The selectivity for the neutral metal chloride can readily be determined by experiments described later.

The amount of the chelating agent in the immiscible solvent is generally an amount at least sufficient to chelate all of the cations of the metal to be recovered which are released when the chloride is removed from the solvent.

The aqueous leaching solution is separated from the immiscible solvent solution containing the neutral metal chloride complex. The aqueous leaching solution containing a reduced amount of the chloride of the metal to be recovered can be further treated to recover other metals or to remove metal chlorides or metal values of metals which tend to build up or accumulate in the leaching solution.

The leaching solution can be oxidized by contact with chlorine or oxygen to place the dissolved metal chlorides in a higher oxidation state or to precipitate metals which tend to accumulate, from the solution. The oxidation step can also be useful to precipitate iron as an iron oxide hydroxide composition such as $FeO(OH)$.

The immiscible solvent containing the complex of the chloride of the metal to be recovered is contacted with an aqueous washing solution to remove the chloride ion from the immiscible solvent. The chloride washing solution, removes the chloride ion from the immiscible solvent into the aqueous washing phase. The cation of the metal to be recovered is simultaneously chelated by the chelating agent in the immiscible solvent phase.

Chelating compositions such as disclosed in U.S. Pat. No. 4,015,980, U.S. Pat. No. 4,065,502, U.S. Pat. No. 4,544,532, U.S. Pat. No. 4,507,268, U.S. Pat. No. 4,582,689 and WO 82/01369, the contents of which are incorporated herein by reference can be useful in the practice of the invention. The chelating reagents are generally in solution in the immiscible solvent solution at from about 0.3 to about 60% by volume preferably above about 1% by volume and most preferably from about 5% to about 40% by volume. Other chelating reagents which will selectively chelate metal cations under the conditions of chloride washing can also be useful in the present invention. Selection of a chelating agent can be made depending upon the metal cation and the other metal ions in the metal chloride leach solution. Experiments such as Experiments 5 and 6 can be utilized to select an optimum chelating agent from a knowledge of the general properties of a particular chelating agent.

The chloride washing is generally done with water or a chloride solution at a pH usually above 1.0. If small amounts of iron chloride are complexed in the immiscible solvent, the chloride washing solution must be maintained at a pH below about 2.5 to prevent precipitation of iron hydroxide. Solid precipitants which may form, or particulate materials in the immiscible solvent act as emulsifying agents and can prevent separation of the immiscible solvent from the aqueous washing solution or slow the separation.

The immiscible solvent containing the chelated cation of the metal to be recovered is separated from the chloride washing solution.

The chloride washing solution can be treated to recover the chlorine values and any alkali values. The treated washing solution can be recycled and contacted with the immiscible solvent containing the neutral metal chloride complex. The solution can be electrolyzed to form chlorine which is contacted with the leaching solution to oxidize the solution and replace the chlorine values lost. If sodium hydroxide has been utilized to control the pH of the aqueous chloride washing solution, the sodium hydroxide formed by electrolysis of the sodium chloride containing solution can be added to the recirculating chloride ion washing solution to maintain the pH at the required level.

The immiscible solvent containing the chelated cation of the metal to be recovered is separated from the aqueous chloride washing solution. The immiscible solvent containing the chelated cation of the metal to be recovered is contacted with an aqueous metal ion stripping solution to strip the cation of the metal to be recovered from the water immiscible solvent. The aqueous stripping solution is separated from the immiscible solvent. The immiscible solvent is then recirculated to contact the aqueous leaching solution and separate the chloride of the metal to be recovered from the leach solution containing metal chlorides. The immiscible solvent can be treated by physical methods such as filtration to remove solid materials to a low level or treated with chemical agents to remove contaminants which tend to build up in the solution or replenish the complexing and chelating agents.

The aqueous stripping solution containing the metal to be recovered is then passed to a metal recovery zone where the metal is recovered. The metal recovery zone can be an electrolysis zone, a cementation zone a precipitation zone or the like. After the metal values have been separated from the aqueous stripping solution, the solution can be recirculated to further contact metal cation loaded solvent to remove metal cations of the metal to be recovered. It is a preferred method of the present invention that the aqueous stripping solution is an acid stripping solution, and the solution, after contact with the water immiscible solvent to strip the cations of the metal to be recovered therefrom, is electrolyzed to form the metal. Preferably, the acid stripping solution is a sulfuric acid solution.

The water immiscible solvents useful in the practice of the invention are well known in the metal extraction art. The water immiscible solvents generally comprise aliphatic, aromatic and alicyclic hydrocarbons chlorinated hydrocarbons, such as perchlorethylene, trichlorethane and trichloroethylene can be useful in a particular process. Mixtures of solvents can be used. In conventional hydrometallurgical practice preferred solvents are mixed hydrocarbon solvents having a high boiling point and high flash point. High boiling petroleum fractions with varying aromatic content are generally preferred. The solvent is generally selected based on the solubility of the complexing and chelating agents and any effect on the hydrometallurgical properties of the complexing and chelating agents.

The process will be illustrated with reference to a process for recovering copper from an ore concentrate containing significant amounts of chloride soluble iron, zinc and silver values. The example is for illustrative purposes only and is not intended to be a limitation to the present invention. Zinc can be recovered from solutions by proper selection of the neutral chloride complexing agent. As illustrated in the figure, a number with the subscript A refers to an aqueous stream, a number with a subscript O refers to an organic stream.

The process is schematically illustrated in the figure. An ore concentrate containing copper sulphide, ferric sulphide, zinc sulphide and silver sulphide enters leaching zone 1 through inlet eleven and is contacted with an aqueous solution comprising zinc chloride, ferric chloride, silver chloride and cupric chloride at a pH below about 1. The aqueous leach solution enters the leach zone through line $5_A$. The copper sulfide, ferric sulfide, zinc sulfide and silver sulfide are reacted with the aqueous solution usually at elevated temperature to extract the copper, iron, zinc and silver as a chloride and produce a solid sulphur. Any pyrite present in the ore concentrate is not dissolved to any significant degree.

A mixture of the leach solution and the undissolved materials passes thru line 12 to liquid solid separation zone 2. In separation zone 2, the undissolved solids are separated from the aqueous leach solution by known methods. The solids are removed from the system through line 13 and comprise solid sulphur, pyrite, silicates and any other undissolved components of the ore or ore concentrate which was fed to the leaching zone.

The aqueous leach solution containing the dissolved metal chlorides, passes through conduit $2_A$ to copper chloride complexing zone 3.

In the copper chloride complexing zone 3 the aqueous leach solution containing the metal chlorides and in particular, the copper chloride to be recovered, is contacted with a solution of a complexing agent selective for copper chloride and a chelating agent selective for the copper ion to be recovered.

The contacting is usually carried out preferably in at least two counter current contacting stages. In a contacting stage, the solution of complexing and chelating agents in the immiscible solvent and the aqueous phase are intimately contacted followed by a separation stage in which the aqueous phase is separated from the water immiscible solvent phase. Counter current extraction processes are utilized in hydrometallurgy and the apparatus used for their implementation are well known in the art and will not be further explained here.

After the final contacting, the aqueous leach solution having had the concentration of the chloride of the metal to be recovered reduced is then recirculated back to the leaching zone. The aqueous leaching solution can be further treated to recover solubilized metal chlorides other than the metal to be recovered and the content of metal chlorides which tend to accumulate in the process can be reduced. Silver can be recovered by cementation with copper from this stream.

If iron, which is soluble in the chloride leach solution is present, the solution can be oxidized, the pH adjusted as necessary, and the iron precipitated as the hydroxide or hydrated oxide to control the iron content at a desired level. The recirculated solution can also be contacted with chlorine and/or oxygen to oxidize the multivalent metal ions to a higher oxidation state or to replenish the chloride ions which have been removed in the form of the metal chloride complex.

The aqueous leach solution leaves the metal complexing zone through line $3_A$ to zone 4 which is an oxidation chlorination zone which receives the chlorine from electrolysis cell 7 through line 15. The oxidized leach solution passes out of the oxidizing zone 4 through line $4_A$ to solid liquid separation zone 5.

In solid liquid separation zone 5, any solids which may precipitate are separated from the liquid phase. The liquid phase is passed through line $5_A$ to leach zone 1 wherein fresh copper containing ore concentrate is contacted with the leach solution.

The solids which are separated from the leach liquid, in solid liquid separation zone 5, pass out of the system through line 18.

The immiscible solvent containing the solution of the complex of the complexing agent and the chloride of the metal to be recovered and the chelating agent passes through line $3_O$ to chloride washing zone 6.

In chloride washing zone 6 the water immiscible solvent is contacted with an aqueous chloride ion washing solution. The aqueous chloride ion washing solution is generally a solution of water and/or chloride at a pH above 1.0 and preferably from about 1.5 to about 2.2. The aqueous chloride washing solution removes the chloride ion from the water immiscible solvent solution. The cation of the metal to be recovered, that is copper, is simultaneously chelated by the chelating agent in the water immiscible solvent. The water immiscible solvent is preferably contacted with the chloride ion washing solution counter currently in at least two contact-settling zones. In the contact settling zones, the water immiscible solution is contacted with the aqueous chloride ion washing solution, the mixture is permitted to settle so that the phases separate, and the water immiscible phase is passed to subsequent metal cation stripping stages.

The separated aqueous chloride ion washing solution passes from the chloride washing zone through line $6_A$ to an electrolysis zone 7. In the electrolysis zone 7, the alkali metal containing chloride washing solution is electrolyzed to form chlorine and sodium hydroxide. The chloride washing solution, having the chloride content reduced in the electrolysis cell, passes from the electrolysis cell through line $7_A$ to the chloride ion washing zone 6. Sodium hydroxide formed in the electrolysis cell passes through the line 16 and is mixed with the chloride washing solution to adjust the pH to the required range. The chlorine formed in the electrolysis cell 7 passes through line 15 to oxidation zone 4 as described.

The water immiscible solvent having the chloride ion content substantially reduced and the cation of the metal to be recovered chelated by the chelating agent in solution in the water immiscible solvent passes through line $6_0$ to metal cation stripping zone 8.

In metal cation stripping zone 8, the water immiscible solvent containing the chelated metal cation is contacted with an aqueous stripping solution for the copper to be recovered. The water immiscible solvent is contacted in at least one contact settler stage wherein the water immiscible solvent containing the chelated copper cations is contacted with an aqueous stripping solution to strip the cation of the metal to be recovered from the water immiscible solvent. Preferably, the aqueous stripping solution is a sulfuric acid solution containing copper sulphate.

The aqueous stripping solution containing the copper sulphate passes to a copper electrowinning cell 9 through line $8_A$. The copper passes from the system through outlet 17 and the aqueous stripping solution returns to the copper cation stripping zone 8 through line $9_A$.

In the electrowinning cell 9, which is well known and understood in the copper electrowinning art, the copper is deposited in the form of a copper sheet and the sulfuric acid concentration of the solution is increased. As is well known in the art, in a recirculating copper stripping and electrowinning operation, the copper cation is not completely eliminated from the solution except for a waste solution which is to be removed from the system.

The water immiscible solvent phase having had the content of chelated copper cation substantially reduced leaves the counter current stripping zone 8 through line $8_0$ and is recirculated to the neutral metal chloride complexing zone 3. The recirculating liquid in line $8_0$ can be further treated to remove solid materials, add additional complexing or chelating agents, remove other impurities and the like before it is introduced into the metal chloride complexing zone.

The complete process can be operated in a continuous or batch manner for recovering copper from a copper sulfide containing ore concentrate.

PREPARATION OF THE COPPER CHLORIDE COMPLEXING AGENT.

Isodecyl-pyridine-3,5-dicarboxylate was prepared as follows: a mixture of 500 grams (3M) of pyridine-3,5-dicarboxlyic acid, was mixed with 1,500 grams (9.5M) of isodecyl alcohol, 200 milliliters of toluene and 5 grams of para-toluene sulfonic acid. The mixture was refluxed for seven days. During the reflux period, the theoretical quantity of water was collected in a Dean-Stark water separator. The reaction mixture was diluted with one liter of toluene and washed twice with 500 milliliter portions of 2% sodium hydroxide followed by two water washes. The volatiles were removed at a reduced pressure to leave 1,283 grams of a product. The infrared spectra was consistent with the expected product.

A 500 gram portion of the crude diester was distilled in a wiped film evaporator. A first fraction was collected at a wall temperature of 190° C. and a pressure of 0.5 millimeters of Mercury absolute. An amount of 52 grams (11%) were collected.

A second fraction was collected at a wall temperature of 220.C and a pressure of 0.01 millimeters of mercury absolute. An amount of 366 grams, (79%) were collected. The infrared spectra was consistent with the di-isodecyl ester of pyridine-3,5-dicarboxylic acid. The di-isodecyl ester of pyridine-3,5-dicarboxylic acid was utilized as the copper chloride complexing agent.

The copper ion chelating agent utilized in the experiments was a commercial composition 5-dodecylsalicylaldoxime (sold commercially as LIX ®860 by Henkel Corp.). The water immiscible solvent utilized in the experiments was a petroleum fraction sold as "Ker-Mac 400/500." The di-isodecyl ester of pyridine-3,5-dicarboxylic acid used in the experiment was the 79% fraction and is noted as C79 in the description that follows.

EXAMPLE 1

The Extraction and Stripping Characteristics of C79

The extraction and stripping Characteristics of C79 were determined without the presence of the LIX ®860 reagent.

A solution of C79 in "KerMac 400/500" as a 26% by volume solution was contacted with an aqueous phase containing 74.0 grams/liter Fe, 25.2 grams/liter Cu, 31.8 grams/liter Zn and 5.86M Cl.

The aqueous phase and the organic phase were mixed at an aqueous/organic ratio of 1/1. The results of the contact are shown in table 1.

TABLE 1

| Time | Phase | Cu g/l | Fe g/l | Zn g/l |
|---|---|---|---|---|
| 60 seconds | Organic | 13.8 | 0.055 | 0.020 |
|  | Aqueous | 11.0 |  |  |
| 180 seconds | Organic | 13.8 | 0.055 | 0.020 |
|  | Aqueous | 11.1 |  |  |

The experiment shows that the copper extraction is rapid and selective utilizing C79. Negligible amounts of iron and zinc were transferred to the organic phase.

EXAMPLE 2.

Effect of Chloride Content

A second experiment was carried out to determine the effect of increasing the chloride content of the aqueous phase by the addition of HCl to the aqueous phase, containing 74.0 grams/liter Fe, 25.2 grams/liter Cu, 31.8 grams/liter Zn and 5.86M Cl. The extraction steps were the same as utilized to determine the extraction and stripping characteristics shown in Table 1 with the exception that the mixing time was 180 seconds in all cases. The results of the experiment are set forth in Table 2. The organic phase was the same as described in Example 1.

TABLE 2

| Cl | Phase | Cu g/l | Fe g/l | Zn g/l |
|---|---|---|---|---|
| 6.42 M | Organic | 13.9 | 0.190 | 0.010 |

TABLE 2-continued

| Cl | Phase | Cu g/l | Fe g/l | Zn g/l |
| --- | --- | --- | --- | --- |
| 6.96 M | Organic | 14.3 | 0.38 | 0.010 |

The addition of HCl and the concomitant lowering of the pH, increased the iron loading in the organic phase.

EXAMPLE 3

Maximum Loading

The maximum loading of the organic phase was determined by contacting the solution of C79 in "KerMac 400/500" used in Example 1, with two portions of the aqueous solution containing iron, copper and zinc used in Example 1 at an organic/aqueous ratio of 1/1. The fully loaded organic phase contained 14.4 grams per liter Cu, 0.088 grams per liter Fe and 0.01 grams per liter Zn.

EXAMPLE 4

Chlorine Stripping

The fully loaded organic phase prepared above was contacted with deionized water at an organic to aqueous volume ratio of 1.0, the pH was permitted to equilibrate and the organic phase and the aqueous phase separated and analyzed. The experiment was repeated adjusting the pH values of the aqueous phase with sodium hydroxide. The results of the stripping are shown in Table 3:

TABLE 3

| pH | Phase | Equilibrium Cu g/l | Fe g/l | Zn g/l |
| --- | --- | --- | --- | --- |
| 1.88 | Organic | 0.45 | 0 | 0 |
|  | Aqueous | 13.4 | 0.031 | 0.003 |
| 2.0 | Organic | 0.41 | 0 | 0 |
|  | Aqueous | 13.51 | 0.033 | 0.003 |
| 2.5 | Organic | 0.04 | 0 | 0 |
| 3.0 | Organic | 0.04 | 0 | 0 |

The results of the test indicate that the organic phase was essentially fully stripped of copper chloride at an equilibrium pH of about 2.5. It is important that the organic phase can be stripped of copper chloride at a pH below about 2.5 since the organic phase can be stripped in the presence of iron and the iron not be precipitated as ferric hydroxide.

EXAMPLE 5

Extraction With Mixed Reagent Solution

Tests were carried out with a mixture of C79 and LIX ®860 containing 26 volume % C79 and 31 volume % LIX ® 860 in KerMac ® 400/500.

A representative regenerated stripped organic phase, which would be recycled in a process to contact the leach liquor, was made by contacting the C79/LIX ® 860/KerMac ® 400/500 mixture with two portions of a strip solution containing 35 grams/liters Cu and 160 grams/liter H$_2$SO$_4$ at an organic/aqueous ratio of 1:1 by volume. After two contacts with the strip solution, the organic phase contained 2.92 grams per liter copper but no iron or zinc. The copper was picked up by the LIX ® 860 chelating reagent in the organic phase.

The organic phase containing 2.92 grams/liter Cu was contacted in an organic/aqueous volume ratio of 1:1 for 100 seconds, with an aqueous solution containing 74 grams/liter Fe, 25.2 grams/liter Cu, 31.8 grams/liter Zn and 5.86M Cl. The organic and aqueous phases were separated and analyzed. The test was repeated after the addition of HCl to the aqueous phase to increase the chloride ion content and lower the pH. The results of the experiment are shown in Table 4.

TABLE 4

| M Cl | pH | Phase | Cu g/l | Fe g/l | Zn g/l |
| --- | --- | --- | --- | --- | --- |
| 5.86 | 1.0 | Organic | 18.2 | 0.22 | 0.064 |
|  |  | Aqueous | 9.3 |  |  |
| 6.42 | 0.5 | Organic | 14.8 | 0.18 | 0.124 |
|  |  | Aqueous | 12.1 |  |  |
| 6.96 | 0.0 | Organic | 12.8 | 0.35 | 0.28 |
|  |  | Aqueous | 13.7 |  |  |

The increase in the chloride content and the lowering of the pH, lowered the amount of copper extracted into the organic phase and slightly increased the iron and zinc extracted into the organic phase.

An additional test was carried out by contacting the aqueous leach solution as in Example 1, with the organic solution, which had contacted the stripping solution, in various ratios of organic to aqueous. The results of the test are shown in Table 5.

TABLE 5

| Ratio by Volume Organic/Aqueous | Sample | g/l Cu | g/l Fe | g/l Zm |
| --- | --- | --- | --- | --- |
| 10/1 | Organic | 5.9 | 0.405 | 0.18 |
|  | Aqueous | 2.46 |  |  |
| 5/1 | Organic | 8.0 | 0.393 | 0.17 |
|  | Aqueous | 3.27 |  |  |
| 2/1 | Organic | 13.2 | 0.290 | 0.10 |
|  | Aqueous | 5.8 |  |  |
| 1/1 | Organic | 18.8 | 0.255 | 0.05 |
|  | Aqueous | 10.0 |  |  |
| 1/2 | Organic | 23.3 | 0.290 | 0.03 |
|  | Aqueous | 15.3 |  |  |
| 1/5 | Organic | 27.2 | 0.290 | 0.02 |
|  | Aqueous | 20.5 |  |  |
| Stripped Organic |  | 2.65 |  |  |

The results of the experiment show that the mixture of the C79/LIX ® 860 reagent is an effective extractant for copper from a solution comprising copper chloride with iron chloride and zinc chloride. The mixing of the LIX ® 860 with the C79 did not affect the useful properties of the C79 as an extractant for neutral copper chloride from a chloride leach solution.

EXAMPLE 6

Chloride Ion Washing

All of the organic phases from the experiment of Table 5 were mixed and contacted with the aqueous feed solution at an organic/aqueous ratio of 1:1 to simulate a fully loaded organic phase. The organic phase which was separated from the aqueous feed solution was then stirred with water at an organic/aqueous ratio of 1:1. The pH was adjusted during mixing to 2.0 with 18.4 ml of 1.0N NaOH. After equilibrating at pH 2.0 for 3 minutes, the mixture was sampled for analysis. The results of the analyses are shown in Table 6.

TABLE 6

| Sample | Cu g/l | Fe g/l | Zn g/l | Cl$^-$ g/l |
| --- | --- | --- | --- | --- |
| Organic/before wash | 20.4 | 0.230 | 0.05 | — |
| Organic/after wash | 17.4 | 0.010 | — | — |
| Aqueous/after wash | 2.73 | 0.170 | 0.06 | 28.43 |

The results of the experiment which are shown in Table 6 indicate that copper was transferred from bonding with the C79 reagent as a chloride complex to bonding with the LIX ® 860 reagent as a Cu cation. The amount of the copper in the aqueous phase after washing indicates that the organic mixture should contain a higher percentage of LIX ® 860 to provide negligible copper in the aqueous wash solution.

However, it is clear that a major portion of the copper remained in the organic phase.

An organic solution containing 8.4 volume % C79 and 25 volume % LIX ® 860 in ESCAID ® 110 (a water immiscible solvent) was prepared. The organic solution was equilibrated three times by contact with an aqueous solution containing 35 g/l Cu and 160 g/l $H_2SO_4$ to provide a stripped organic phase. The equilibrated organic phase was contacted in a 1:1 volume ratio with an aqueous chloride solution containing 25.6 g/l Cu, 69.2 g/l Ferric ion and 32.5 g/l Zn at a pH of 1.0.

The organic phase was separated from the aqueous phase. The organic phase was contacted with water at an organic/aqueous ratio of 1:1 at a pH of 2.01. The pH of the aqueous phase was adjusted by addition of 1.0 normal NaOH. The organic phase was analyzed before and after contact with the water phase and the water phase was analyzed. The results of the experiment are shown in Table. 7.

TABLE 7

|  | Cu g/l | Fe g/l | Zn g/l |
|---|---|---|---|
| Organic phase before contact with water | 11.6 | 0.070 | 0.010 |
| Organic phase after contact with water | 11.5 | 0.050 | 0 |
| Water phase after contact with organic phase | 0.060 | 0.040 |  |

The ratio of C79/LIX ® 860 in the organic phase reduced the amount of copper, transferred to the aqueous phase with the chloride ions, to a negligible value.

EXAMPLE 7

Copper Stripping

The chloride washed organic phase (organic phase after wash of Example 6) was contacted with a copper electrowinning electrolyte containing 30 grams/liter Cu and 160 gram/liter $H_2SO_4$ at an organic/aqueous volume ratio of 1:1 for 3 minutes. The organic phase after contact with the electrolyte contained 2.40 grams/liter copper. The aqueous solution contained only trace amounts of chloride. The low chloride content provides an aqueous phase which is a suitable electrolyte for electrowinning copper by known electrowinning processes to provide sheet copper.

EXAMPLE 8

Extraction Kinetics

The extraction kinetics of the organic phase containing both the C79 and LIX ® 860 reagents were determined by contacting the organic phase, which had contacted the copper electrolyte consisting of 35 g/l Cu and 160 g/l $H_2SO_4$, with the aqueous metal chloride leach solution at an organic/aqueous ratio of 1:1. Samples were taken at timed intervals to determine the amount of the metals of concern which had been transferred to the organic phase. The samples of the organic phase were filtered through number IPS phase separator filter paper to remove entrained aqueous phase and analyzed. The results of the kinetic study are shown in Table 8.

TABLE 8

| | Organic Phase | | |
|---|---|---|---|
| Time, Sec. | Cu g/l | Fe g/l | Zn g/l |
| 0 | 2.82 | 0.00 | 0.00 |
| 30 | 18.6 | 0.195 | 0.05 |
| 60 | 19.4 | 0.218 | 0.05 |
| 90 | 19.7 | 0.253 | 0.06 |
| 120 | 19.7 | 0.265 | 0.06 |
| 180 | 19.9 | 0.280 | 0.06 |
| 240 | 19.8 | 0.285 | 0.06 |
| 300 | 19.7 | 0.260 | 0.06 |
| 360 | 19.8 | 0.210 | 0.05 |
| 600 | 19.8 | 0.255 | 0.05 |

The extraction studies show that the extraction of copper is very rapid and highly selective for copper over iron and zinc.

The process above has been exemplified in relation to a process for recovering copper values from a chloride leach solution containing significant amounts of iron, copper and zinc. The process can be adapted to recovering other base metals from a chloride leach solution by proper selection of a complexing agent, selective for the chloride of the metal to be recovered, in combination with a chelating agent having affinity for the cation of the metal to be recovered.

Reagents such as dibutyl butyl phosphonate (DBBP) and dipentyl pentyl phosphonate (DPPP) are suitable for use as chloride complexing reagents and in combination with chelating compositions such as LIX ® 860 or an alkylated 8-hydroxyquinoline could be used, in the process of the invention, to recover zinc from a chloride leach solution containing zinc chloride, copper chloride and ferrous chloride.

The chloride complexing agents useful in the practice of the invention include compounds with nitrogen-oxygen-carbon containing functional groups, also sulfur or phosphorous oxygen containing compositions, alkyl sulfides, crown ethers and the like.

The useful neutral chloride complexing agents include compounds of the formula $(R)_3PO$ and $R\,P(O)(OR)_2$ wherein R is an alkyl or aryl group having at least 4 carbon atoms and preferably from about 4 to about 12 carbon atoms. Compounds of formula

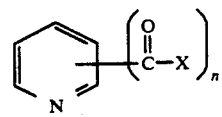

wherein X is the group OR or $-NR_2R_3$, $R_1$ is a hydrocarbyl group containing from 5 to 36 carbon atoms and $R_2$ and $R_3$ are hydrogen or a hydrocarbyl group, $R_2$ and $R_3$ together containing from 5 to 36 carbon atoms and n is 1, 2, or 3 are also useful chloride complexing agents for use in the process of the present invention.

Typical chloride complexing reagents include pyridine derivatives, alkyl and aryl phosphates and phosphonates.

Useful neutral chloride complexing agents include the biimidazoles and bibenzimidazoles of the formula

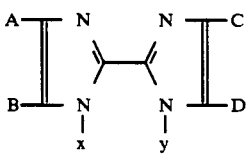

disclosed in European Patent specification EP 0 196,153 wherein X and Y, which may be the same or different, taken together contain a total of from 12 to 52 saturated carbon atoms and are each selected from the group R—,RCO—,—CH₂COOR,—CH(COOR)₂ and —COOR wherein R is a hydrocarbyl group; or wherein X and Y taken together contain a total of from 12 to 52 saturated carbon atoms and taken together are selected from the groups

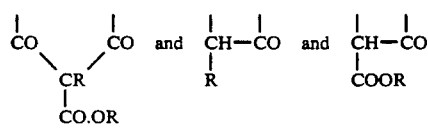

wherein R is a hydrocarbyl group; and wherein A, B, C and D, which may be the same or different are each hydrogen or a substituent Z, wherein Z is lower alkyl, halogen, nitro, cyano or —COO R' wherein R' is lower alkyl; or A and B taken together with the two carbon atoms joining them form a cyclohexane ring optionally substituted with substituent Z and/or C and D taken together with the two carbon atoms joining them form a cyclohexane ring optionally substituted with substituent Z; or A and B taken together with the two carbon atoms joining them form a benzene ring optionally substituted with substituent Z and/or C and D taken together with the two carbon atoms joining them form a benzene ring optionally substituted with substituent Z and the lower alkyl group contains from 1 to 6 carbon atoms.

The lower alkyl group is preferably one containing from 1 to 4 carbon atoms.

The group R is preferably an alkyl, optionally substituted aryl, optionally substituted alkyaryl, optionally substituted arylalkyl, optionally substituted cycloalkyl or optionally substituted alkoxyalky. It is to be noted that X and Y may be the same or different, and hence different groups R may be present in X and Y. Especially preferred groups R are branched alkyl groups containing from 8 to 24 carbon atoms, provided that the groups X and Y together contain from 12 to 52 saturated carbon atoms.

The groups X and Y are preferably the same. Preferred groups X and Y are the group —COOR. Thus it is especially preferred that the groups X and Y are the same and are both —COOR wherein R is a branched chain alkyl group containing from 8 to 24 carbon atoms. Improved solubility in desired solvents may often be achieved when the group R is a mixture of alkyl groups and especially an isomeric mixture of alkyl groups containing the same number of carbon atoms.

When A and B taken together with the two carbon atoms joining them are optionally substituted cyclohexane rings, C and D may each be hydrogen or one of the substituents Z defined above. Alternatively, both A and B taken together with the two carbon atoms joining them and C and D taken together with the two carbon atoms joining them may be optionally substituted cyclohexane rings. The optional substituents which may be present in the cyclohexane ring(s) are the substituents Z as defined above.

When A and B taken together with the two carbon atoms joining them are optionally substituted benzene rings, C and D may each be hydrogen or one of the substituents Z defined above. Alternatively, both A and B taken together with the two carbon atoms joining them and C and D taken together with the two carbon atoms joining them may be optionally substituted benzene rings. The optional substituents which may be present in the benzene ring(s) are the substituents Z as defined above. An especially preferred class of compounds are 2.2'-bibenzimidazoles of the formula;

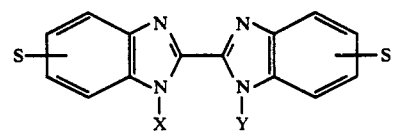

wherein S and S' are separately hydrogen or any of the substituents as defined above for Z, S and S' are preferably hydrogen, lower alkyl (for example methyl) or halogen, it is preferred that the 4 and 4' positions in the bibenzimidazole are free of substitution. Thus in especially preferred compounds of formula (II), S and S' are separately hydrogen or methyl (in a position other than 4, 4', or 7, 7') and X and Y represent the group —COOR in which R is a hydrocarbyl group as defined. In a preferred group of such compounds, S and S' are hydrogen and X and Y are the same and are each the group —COOR wherein R is a branched primary alkyl group or an isomeric mixture of branched primary alkyl groups. By the term "branched primary alkyl group" as that term is used to describe the biimidazole and bibenzimidazole compounds is meant a branched alkyl group bearing two hydrogen atoms on the carbon atom linked to the oxygen atom in the group -COOR. It has been found that such compounds generally have an especially high affinity for zinc combined with good selectivity against acid transfer.

The metal cation chelating agents useful in the practice of the invention include beta diketones, hydroxyaryl oximes, substituted 8-hydroxy quinolines and substituted sulfonamide quinolines.

Useful chelating agents include hydroxy quinolines of the formula

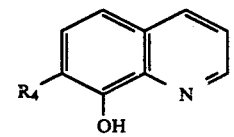

wherein R₄ is an alkyl or aryl group having at least 7 carbon atoms and preferably from about 7 to about 20 carbon atoms. The useful chelating agents also include ketoximes and aldoximes of the formula

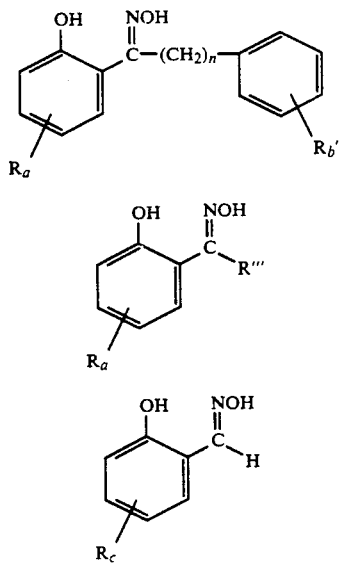

wherein R and R' can be alike or different and are saturated aliphatic groups of 1 to 25 carbon atoms, ethylenically unsaturated aliphatic groups of 3 to 25 carbon atoms or —OR" wherein R" is a saturated aliphatic group of 1 to 20 carbon atoms or an ethylenically unsaturated aliphatic group of from 3 to 25 carbon atoms, n is 0 or 1; and a and b are each independently 0, 1, 2, 3 or 4 with the proviso that both a and b are not zero and the total number of carbon atoms in R and $R_b'$ is from 3 to about 25, and wherein R''' is a saturated aliphatic group of 1 to 25 carbon atoms or an ethylenically unsaturated aliphatic group of 3 to 25 carbon atoms, with the proviso that the total number of carbon atoms in $R_a$ and R''' is from 3 to 25 and C is 1, 2, 3 or 4 and the total number of carbon atoms in $R_c$ is from 3 to about 25.

Typical chelating reagents include hydroxy aryl oximes such as LIX®84, LIX®65N, LIX®54, and LIX®51, substituted 8-hydroxy quinolines such as LIX®26, and KELEX®100, and substituted sulfamido quinolines such as LIX®34.

The process of the present invention is a method whereby metals can be easily recovered in useful form from a chloride leach solution. The process is not dependent in the use of particular chloride complexing and chelating compounds as long as the compounds are selective for the metal to be recovered in relation to the other metals in the chloride solution, can be dissolved in the immiscible solvent and do not adversely affect the required complexing and chelating functions of the reagents.

The process has been illustrated to show the recovery of copper from a chloride leach solution containing iron, zinc, silver and copper. It is possible to utilize the process of the invention to recover more than one metal from the leach solution by contacting the aqueous leach solution with an immiscible solvent, a complexing agent selective for a first neutral chloride of a first metal to be recovered and a chelating agent for the cation of the first metal; separating the aqueous leach solution from the immiscible solvent and contacting the aqueous leach solution from which the neutral chloride of the first metal has been recovered with a second immiscible solvent, a complexing agent selective for a second neutral chloride of a second metal to be recovered and a chelating agent for the cation of the second metal to be recovered and separating the immiscible solvent from the aqueous leach solution. The first and second immiscible solvent solutions containing the neutral metal chloride complexes are each treated separately to remove the chloride ions and recover the metal values by the process steps disclosed.

What is claimed is:

1. A process for recovering metal values from an aqueous solution comprising a mixture of metal chlorides which comprises:

(A) contacting the aqueous solution comprising a mixture of metal chlorides with an organic solution of a complexing agent, selective for the neutral metal chloride of the metal to be recovered, and a chelating agent having affinity for the cation of the metal to be recovered, in a water immiscible solvent, to form an organic solution containing a complex of the complexing agent and the neutral metal chloride of the metal to be recovered in the water immiscible solvent;

(B) separating the water immiscible solvent from the aqueous solution comprising the mixture of metal chlorides;

(C) contacting the water immiscible solvent, containing the neutral metal chloride complex, with an aqueous chloride washing solution to remove chloride ions from the water immiscible solvent and simultaneously chelate the cation of the metal to be recovered in solution in the water immiscible solvent;

(D) contacting the water immiscible solvent containing the chelated cation of the metal to be recovered with an aqueous stripping solution to form an aqueous solution rich in the cation of the metal to be recovered and a water immiscible solvent containing a reduced amount of chelated cation of the metal to be recovered; and (E) recovering the metal from the aqueous solution rich in the cation of the metal to be recovered.

2. A process of claim 1 wherein the metal to be recovered is copper and the aqueous solution comprises copper chloride and a chloride of at least one of iron and zinc.

3. A process of claim 1 wherein the metal to be recovered is zinc and the aqueous solution comprises zinc chloride and a chloride of at least one of iron and copper.

4. A process of claim 1 wherein the immiscible solvent contains a complexing agent in a volume percent of from about 1.0 to about 60 and a chelating agent in a volume percent of from about 1.0 to about 60.

5. A process of claim 4 wherein the metal to be recovered is copper.

6. A process of claim 4 wherein the metal to be recovered is zinc.

7. A process of claim 1 wherein the complexing agent, selective for the neutral chloride of the metal to be recovered, comprises at least one composition selected from the group consisting of carbon, sulfur and phosphorous bonded oxygen containing compounds.

8. A process of claim 1 wherein the metal chloride complexing agent comprises at least one compound of the formula:

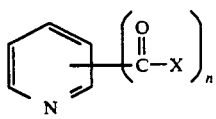

wherein x is the group $OR_1$ or $-NR_2R_3$, $R_1$ is a hydrocarbyl group containing from 5 to 36 carbon atoms and $R_2$ and $R_3$ are hydrogen or a hydrocarbyl group, $R_2$ and $R_3$ together containing from 5 to 36 carbon atoms and n is 1, 2, or 3.

9. A process of claim 1 wherein the metal chloride complexing agent comprises at least one compound selected from the group consisting of biimidazole and bibenzimidazole extractants of the formula

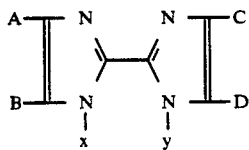

wherein X and Y, which may be the same or different, taken together contain a total of from 12 to 52 saturated carbon atoms and are each selected from the group R—, RCO—, $-CH_2COOR$, $-CH(COOR)_2$ and —COOR wherein R is a hydrocarbyl group; or wherein X and Y taken together contain a total of from 12 to 52 saturated carbon atoms and taken together are selected from the groups

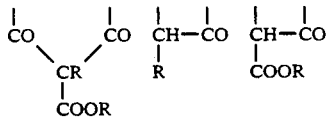

wherein R is a hydrocarbyl group; and wherein A, B, C and D, which may be the same or different are each hydrogen or a substituent Z, wherein Z is lower alkyl, halogen, nitro, cyano or —COO R' wherein R' is lower alkyl, A and B taken together with the two carbon atoms joining them can form a cyclohexane ring, a cyclohexane ring substituted with Z, C and taken together with the two carbon atoms joining them can form a cyclohexane ring, a cyclohexane ring substituted with Z, A and B taken together with the two carbon atoms joining them can form a benzene ring, a benzene ring substituted with substituent Z, C and D taken together with the two carbon atoms joining them can form a benzene ring, a benzene ring substituted with substituent Z when the lower alkyl group contains from 1 to 6 carbon atoms; wherein the group R is selected from the group consisting of alkyl, aryl, substituted aryl, alkaryl substituted alkaryl, arylalkyl, substituted arylalkyl, cycloalkyl, substituted cycloalkyl and alkoxyalkyl, substituted alkoxalkyl wherein X and Y can be the same or different, and different R groups can be present in X and Y provided that the groups X and Y together contain from 12 to 52 saturated carbon atoms.

10. A process of claim 1 wherein the chelating agent comprises at least one chelating agent selected from the group consisting of hydroxyoximes, beta diketones, hydroxy quinolines and sulfonamide quinolines.

11. A process of claim 1 wherein the chelating agent comprises a composition of the formula

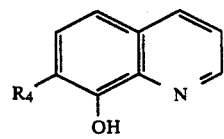

wherein $R_4$ is an alkyl or aryl group having from about 7 to about 20 carbon atoms.

12. A process of claim 10 wherein the chelating agent comprises at least one compound of the formula:

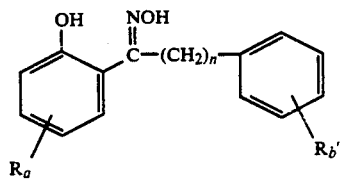

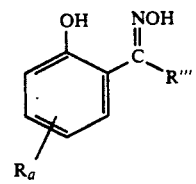

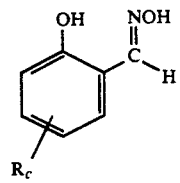

wherein R and R' can be alike or different and are saturated aliphatic groups of 1 to 25 carbon atoms, ethylenically unsaturated aliphatic groups of 3 to 25 carbon atoms or —OR" wherein R" is a saturated aliphatic group of 1 to 20 carbon atoms or an ethylenically unsaturated aliphatic group of from 3 to 25 carbon atoms; n is 0 or 1; and a and b are each independently 0, 1, 2, 3 or 4 with the proviso that both a and b are not zero and the total number of carbon atoms in $R_a$ and $R'_b$ is from 3 to about 25, and wherein R''' is a saturated aliphatic group of 1 to 25 carbon atoms or an ethylenically unsaturated aliphatic group of 3 to 25 carbon atoms, with the proviso that the total number of carbon atoms in $R_a$ and R''' is from 3 to 25 and C is 1, 2, 3 or 4 and the total number of carbon atoms in $R_c$ is from 3 to 25.

13. A process of claim 10 wherein the chelating agent comprises at least β-diketone of the formula

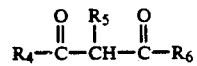

wherein $R_4$ is phenyl or alkyl substituted phenyl, $R_6$ is alkyl, alkyl substituted phenyl or chloro or fluoro substituted phenyl and $R^5$ is H or CN with the proviso that when $R_4$ is phenyl, $R_6$ is a branched chain alkyl group of at least 7 carbon atoms and when $R_4$ is alkyl substituted phenyl, the number of carbon atoms in the alkyl substituent or substituents is at least 7 and at least one such alkyl substituent is branched.

14. A process of claim 8 wherein the complexing agent comprises di-isodecyl-pyridine-3,5-dicarboxylate.

15. A process of claim 8 wherein the chelating composition comprises at least one hydroxyaryloxime.

16. A process of claim 1 for recovering copper values wherein the complexing agent comprises di-isodecyl-pyridine-3,5-dicarboxylate and the chelating agent comprises a hydroxyaryloxime.

17. A process of claim 1 wherein the chlorine wash solution is electrochemically treated to recover chlorine and sodium hydroxide.

18. A process of claim 1 wherein the solution of the chloride complexing agent an the chelating agent in the immiscible solvent, after contact with the aqueous stripping solution, is returned to the step of contacting the aqueous solution comprising a mixture of metal chlorides.

19. A process of claim 11 wherein the solution of the chloride complexing agent and the chelating agent in the immiscible solvent, after contact with the aqueous stripping solution, is returned to the step of contacting the aqueous solution comprising a mixture of metal chlorides.

20. A process for recovering metal values from an aqueous solution comprising a mixture of metal chlorides which comprises:
(A) contacting the aqueous solution comprising metal chlorides with a solution of a complexing agent, for the neutral metal chloride of the metal to the recovered, and a chelating agent having affinity for the cation of the metal to be recovered, in a water immiscible solvent, to form an organic solution containing a complex of the complexing agent and the neutral metal chloride of the metal to be recovered in the water immiscible solvent;
(B) separating the water immiscible solvent from the aqueous solution comprising the mixture of metal chlorides;
(C) contacting the water immiscible solvent, containing the neutral metal chloride complex, with an aqueous chloride washing solution to remove chloride ions from the water immiscible solvent and simultaneously chelating the cation of the metal to be recovered in solution in the water immiscible solvent;
(D) contacting the water immiscible solvent containing the chelated cation of the metal to be recovered with an aqueous stripping solution to form an aqueous solution rich in the cation of the metal to be recovered and a water immiscible solvent containing a reduced amount of chelated cation of the metal to be recovered;
(E) contacting the aqueous metal chloride solution in step (A) with the immiscible solvent containing a reduced amount of chelated cation of the metal to be recovered; and
(F) recovering the metal from the aqueous solution rich in the cation of the metal to be recovered.

21. A process of claim 9 for recovering zinc values wherein the chelating agent comprises at least one member selected from the group consisting of hydroxylaryloxime, alkyl 8-hydroxy quinoline and beta diketone.

* * * * *

UNITED STATES PATENT AND TRADEMARK OFFICE
CERTIFICATE OF CORRECTION

PATENT NO. : 5,196,095

DATED : March 23, 1993

INVENTOR(S) : Sudderth et al.

It is certified that error appears in the above-identified patent and that said Letters Patent is hereby corrected as shown below:

column 15, line 30, "cyclohexane" should read: -- cyclohexene --.
    column 15, line 33, "cyclohexane" should read: -- cyclohexene --.
    column 15, line 63, "cyclohexane" should read: -- cyclohexene --.
    column 16, line 1, "cyclohexane" should read: -- cyclohexene --.
    column 16, line 2, "cyclohexane" should read: -- cyclohexene --.

In claim 9, column 19, line 46, "cyclohexane" should read:--cyclohexene--.

In claim 9, column 19, line 47, "cyclohexane" should read:--cyclohexene--.

In claim 9, column 19, line 47, "Z, C and" should read:-- Z, C, and D --.

In claim 9, column 19, line 49, " cyclohexane ring, a cyclohexane " should read: -- cyclohexene ring, a cyclohexene --.

In claim 11, column 20, line 1, "claim 1" should read: -- claim 10 --.

In claim 18, column 21, line 13, "an" should read: -- and --.

In claim 19, column 21, line 18, "claim 11" should read: -- claim 16 --.

UNITED STATES PATENT AND TRADEMARK OFFICE
CERTIFICATE OF CORRECTION

PATENT NO. : 5,196,095

DATED : March 23, 1993

INVENTOR(S) : Sudderth et al

It is certified that error appears in the above-indentified patent and that said Letters Patent is hereby corrected as shown below:

Column 21, claim 20, line 29, "the" should read, --be--

Signed and Sealed this

Eighth Day of November, 1994

Attest:

BRUCE LEHMAN

*Attesting Officer*    Commissioner of Patents and Trademarks